United States Patent
Cai et al.

(10) Patent No.: US 8,043,598 B2
(45) Date of Patent: Oct. 25, 2011

(54) SYNTHESIS OF RARE EARTH ELEMENT-CONTAINING ALUMINA NANOWIRES

(75) Inventors: Mei Cai, Bloomfield Hills, MI (US); Xueliang Sun, London (CA); Yong Zhang, London (CA); Ruying Li, London (CA)

(73) Assignees: GM Global Technology Operations LLC, Detroit, MI (US); The University of Western Ontario, London, CA (US)

( * ) Notice: Subject to any disclaimer, the term of this patent is extended or adjusted under 35 U.S.C. 154(b) by 253 days.

(21) Appl. No.: 12/324,184

(22) Filed: Nov. 26, 2008

(65) Prior Publication Data

US 2010/0130351 A1    May 27, 2010

(51) Int. Cl.
*C01F 7/02*    (2006.01)
(52) U.S. Cl. ........ 423/625; 423/263; 423/275; 977/762; 428/546
(58) Field of Classification Search .................. 423/600, 423/625–630, 263, 275; 977/762; 428/545, 428/546, 567, 650
See application file for complete search history.

(56) References Cited

U.S. PATENT DOCUMENTS

| 5,053,369 A | * | 10/1991 | Winkler et al. ............. 501/152 |
| 2005/0227864 A1 | * | 10/2005 | Sutorik et al. ............. 502/304 |
| 2010/0284125 A1 | * | 11/2010 | Moon et al. ............. 361/305 |

FOREIGN PATENT DOCUMENTS
KR    10-2008-0035363    *    4/2008

OTHER PUBLICATIONS

Zhou et al., "Synthesis of crystalline alumina nanowires and nanotrees", 2002, Chemical Physics Letters, 365, 505-508.*

"CDC—NIOSH Pocket Guide to Chemical Hazards—alpha-Alumina" Last update Nov. 2010. <http://www.cdc.gov/niosh/npg/npgd0021.html> Accessed Apr. 26, 2011.*

Young Zhang, et al.; Selective Growth of a-Al2O3 Nanowires; Hindwai Publishing Corp. Journal of Nanomaterials, vol. 2008, Article ID 250370, 8 pages; doi:10/11.

Young Zhang, et al.; Self-Organizing Growth of MgAl2O4 Based Heterostructural Nanochains; J. Phys. Chem. C2008, 112, 10038-10042.

Madhu Sudan Saha, et al.; High Electrocatalytic Activity of Platinum Nanoparticles on SnO2, Nanowire-Based Electrodes; Electrochemical and Solid-State Letters 10 (8) B130-B133.

C.C. Tang et al; In situ catalytic growth of Al2O3 and Si nanowires; Journal of Crystal Growth 224 (2001) 117-121.

Nien-Fang Wu et al; Doped spiral alumina nanowires; The Royal Society of Chemistry 2005; Chem. Commun., 2005; 204-206.

Sheng Wang et al; Room temperature and long-lasting blue phosphorescence of Cr-doped x-Al2O3 nanowires; Chemical Physics Letters 460 (2008) 200-204.

Yong Zhang, Selective Growth of x-Al2O3 Nanowires and Nanobelts; Hindawi Publishing Corporation, Journal of Nanomaterials, vol. 2008, Article ID 250370, 8 pages; doi: 10.1155/2008/250370.

German Office Action dated Mar. 16, 2011; three pages.

* cited by examiner

*Primary Examiner* — Stuart Hendrickson
*Assistant Examiner* — Richard M Rump
(74) *Attorney, Agent, or Firm* — Reising Ethington P.C.

(57) ABSTRACT

Rare earth element(s) doped alumina nanowires are formed by a thermal evaporation method in which vapor from aluminum powder and vapor from a rare earth element compound (such as an halide) are reacted in an oxygen-containing inert gas stream to form alumina which deposits as alumina nanowires and as a rare earth element and oxygen-containing material that deposits with and/or on the alumina nanowires. Where the RE-doped alumina nanowires are to be used as catalyst supports, a catalyst material, such as platinum, may be deposited as small particles on the nanowires.

15 Claims, 3 Drawing Sheets

SYNTHESIS OF RARE EARTH ELEMENT-CONTAINING ALUMINA NANOWIRES

TECHNICAL FIELD

This invention pertains to alumina nanometer size wires. More specifically, this invention pertains to a method of making alumina nanowires, especially nanowires in which the alumina contains or carries one or more rare earth group elements such as cerium or lanthanum. The rare earth constituent is often present as an oxide. And the nanowires may be used as catalyst supports, such as in three-way catalyst control systems for automotive vehicles.

BACKGROUND OF THE INVENTION

Alumina ($Al_2O_3$) and alumina-containing compositions are used in many articles of manufacture. In many of its applications alumina is used in the form of small, somewhat spherical particles with high specific surface area ($m^2/g$) as a support medium for even smaller particles of a catalyst metal or material. The alumina support particles provide a durable base for the function of the catalyst material.

Vehicle exhaust systems use catalytic converters to treat unburned hydrocarbons (HC), carbon monoxide (CO) and various nitrogen oxides (NOx) produced from the combustion of hydrocarbon fuels in the engine. A typical catalyst comprises one or more noble metals dispersed on high surface area alumina carrier particles. Often the alumina particles are mixed with particles of another oxide, such as ceria or lanthana, for oxygen storage during exhaust treatment.

Recently, one-dimensional (1D) nanostructures have attracted considerable interest in catalysis fields due to their large specific surface area, high sensitivity and activity, which promise improved catalytic efficiency. Provided that a hybrid of alumina and cerium (or other rare earth element) can be made as a one dimensional nanostructure, the efficiency and durability of the alumina/ceria based three-way catalyst may be significantly enhanced. Currently, wet chemical methods have been widely applied in three-way catalyst production, including sol-gel, hydrothermal, microemulsion methods and so on. However, it still remains a challenge to generate well crystallized, one-dimensional, Ce-doped alumina nanostructures using the conventional wet chemical methods.

It is an object of this invention to provide a method for making crystalline alumina nanowires in which the alumina structures may contain or carry one or more rare earth elements.

SUMMARY OF THE INVENTION

A mixture of aluminum powder and particles of a rare earth compound are mixed and placed in a shallow, open-top boat or other suitable vessel to permit vapor evolution from the solids mixture. Sometimes it is useful to place one or more alumina plates across a portion of the top of the vessel. The alumina plate(s) does not stop vapor rising from the vessel but serves as a substrate for deposition of the nanowire products.

The aluminum powder may be of suitable commercial quality and, for example, about 20 mesh size. Cerium and lanthanum are examples of rare earth elements that may be used for doping of the alumina nanometer size wires to be produced. The rare earth element is initially provided as suitably volatile compound such as a halide compound. For example, cerium chloride or cerium iodide provides suitable volatility in mixture with aluminum powder for this synthesis.

The vessel holding the mixture of aluminum powder and rare earth compound is contained in a reaction chamber which is suitably a horizontal alumina tube heated by an enclosing tubular electric furnace. The vessel is heated under an inert gas such as argon to a temperature of, for example, about 1300° C. The temperature range is selected to produce suitable vapors to conduct the desired vapor-phase reactions. A grade of argon is used that contains a small amount of oxygen and the oxygen-containing argon is preferably flowed through the tube at substantially atmospheric pressure and over the vessel. Aluminum vapor is produced and oxidized by the oxygen to alpha-alumina. The alumina forms as nanometer-size diameter wires. The nanowires wires may be several microns in length up to hundreds of microns in length depending on the duration of the reaction. The rare earth compound vaporizes, decomposes, and the rare earth element is also oxidized. The rare earth oxide deposits on or within the alumina nanowires. The rare earth oxide (e.g., REOx) is not necessarily a stoichiometric oxide compound like $CeO_2$.

The flow rate of the inert gas is controlled to bring oxygen into contact with vapors rising from the open vessel in the reactor chamber. A commercial grade of argon may contain oxygen at a partial pressure of about $10^{-5}$ atm. If desired, additional oxygen may be introduced into the inert gas stream. Since the α-alumina and rare earth oxides that are formed are solids at the temperature in the reactor they precipitate from inert gas stream on the alumina substrate or on un-vaporized powder in the vessel. The alumina nanowires, thus doped with a cerium oxide, lanthanum oxide, or the like, are harvested from the flow-through reactor when argon flow is stopped.

The rare earth oxide bearing alumina nanowires may have diameters of the order of about 10 nm to about 100 nm with lengths of up to two to three hundred microns. Because of their very small diameters, such nanowires wires are often referred to as being one-dimensional. These structures are suitable as catalyst supports for many catalytic reactions and applications. Fine particles of a catalytic metal, alloy or other composition may be deposited on surfaces of the nanowires by, for example, chemical reduction, other chemical deposition reactions, electrolytic deposition, or other suitable deposition methods. When platinum and/or other platinum group metals are suitably deposited on these high surface area, RE-doped alumina nanowires, the resulting materials may provide improved performances as three-way catalysts for the treatment of automotive vehicle exhaust streams. Or the doped alumina nanowires may be used as supports for other catalysts in other catalyzed reactions.

Other objects and advantages of the invention will be apparent from a detailed description of preferred embodiments which follows in this specification.

DESCRIPTION OF PREFERRED EMBODIMENTS

Nanostructured materials (i.e., structures with at least one dimension in the range of about 1-100 nm) have attracted steadily growing interest due to their unique, fascinating properties and potential applications complementary to three-dimensional bulk materials. Dimensionality plays a critical role in determining the properties of materials due to, for example, the different ways that electrons interact in three-dimensional (3D), two-dimensional (2D), one-dimensional (1D), and zero-dimensional (0D) structures. A major challenge in the synthesis of nanowires is to control their size, morphology, phase purity, crystallinity, and chemical composition. Processes are provided for the synthesis of alumina nanowires doped with the oxide(s) of one or more rare elements.

Figure 1:
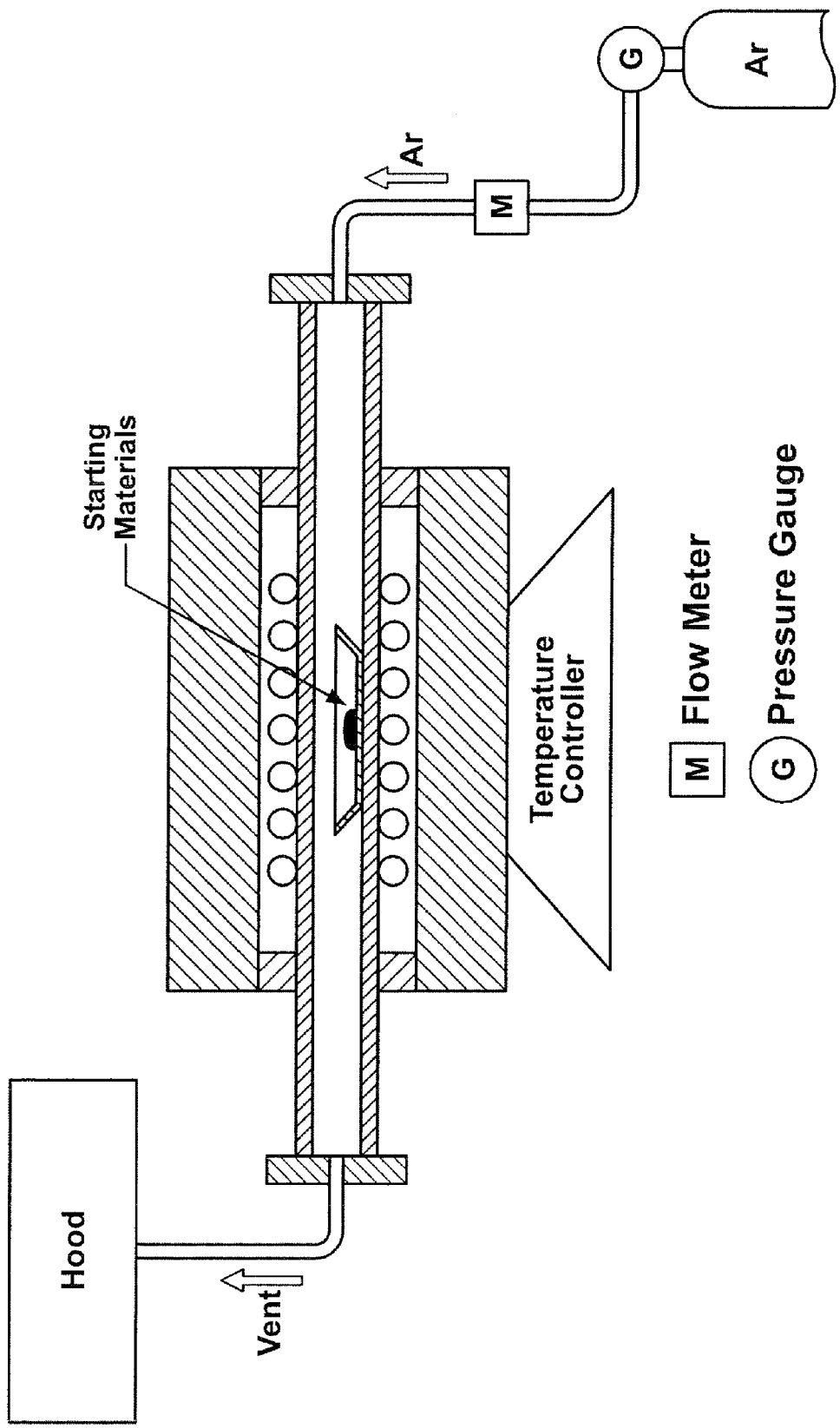
FIG. 1 is a schematic drawing of apparatus for the making of rare earth element oxide-containing alumina nanowires.

Alpha-alumina nanowires and α-alumina nanowires doped with a cerium oxide or lanthanum oxide were synthesized by a thermal evaporation method. A schematic diagram of a round, cylindrical, tubular flow-through reactor and related apparatus is shown in FIG. 1. For the synthesis of RE doped alumina nanowires, an open top alumina boat loaded with a mixture of pure commercial aluminum powders and either cerium iodide ($CeI_3$) or lanthanum iodide ($LaI_3$) was placed in the middle of an alumina tube which was inserted into a horizontal, tubular, electrical resistance heated furnace. The reactor and alumina boat are sized for a specified volume of nanowires production. A alumina plate was placed across the top of the boat (without fully covering it) as a substrate for the deposition of the rare earth element-doped alumina nanowires. A temperature controller was used to manage the temperature of this cylindrical tubular reactor. Of course, for the synthesis of comparative non-doped $\alpha\text{-}Al_2O_3$ nanowires, no rare earth compound was added to the vessel.

The reaction vessel with a mixture of aluminum powder and $CeI_3$ powder was rapidly heated in the alumina tube to a temperature of about 1300° C. as argon at about atmospheric pressure was flowed into one end of the tubular reactor at a flow rate of 500 standard cubic centimeters per minute. The argon was supplied from a commercial cylinder using a pressure gage and flow meter to control and monitor the argon flow rate. The argon flow that exited the other end of the reactor tube was vented through a hood.

The argon gas contained oxygen at a partial pressure of about $10^{-5}$ atmospheres. The furnace maintained the temperature of the tube reactor and its contents at 1300° C. for about 2 hours. The furnace was then turned off and the reaction vessel was cooled to room temperature under a continued flow of argon gas. When the cooled reaction vessel was removed from the tubular reactor it contained a cluster of intertwined, individual nanometer size diameter wires, confirmed to be alpha-alumina. The cluster of nanowires was formed on the alumina plate placed on top of the vessel. As will be illustrated below, the alumina nanowires were found to carry particles of oxidized cerium.

Essentially the same reaction procedure was conducted using an alumina boat containing only aluminum powder. Again, a cluster of intermingled alumina nanowires were formed on an alumina plate.

Figure 2A:
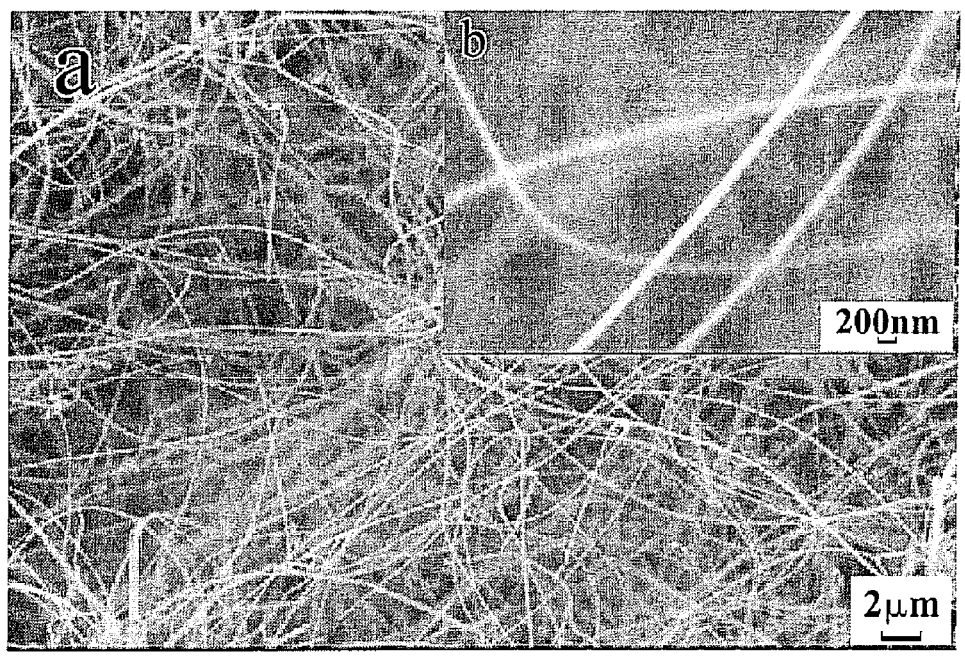
FIG. 2A is an SEM image of alumina nanowires with no rare earth element doping. Portion "a" of the photograph is at relatively low magnification. Portion "b" of the SEM photograph is at higher magnification.
Figure 3A:
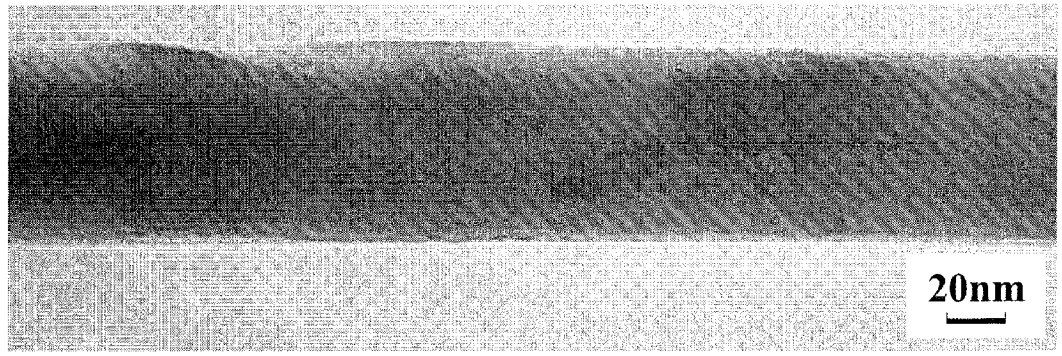
FIG. 3A is a TEM image of a free-standing alumina nanowire with no rare earth element dopant.

Samples of the two synthesized groups of alumina powder were examined by scanning electron microscopy (SEM) and transmission electron microscopy (TEM). FIG. 2(A) shows two SEM micrographs of alpha-alumina nanowires. Micrograph "a" is a relatively low magnification (2 micron scale) and the insert micrograph "b" (with the 200 nm scale) is at relatively high magnification. FIG. 3A is a TEM of a free-standing alumina nanowires produced in the synthesis. The freestanding nanowire is seen to have a diameter of about sixty nanometers. FIG. 2A shows that the $\alpha\text{-}Al_2O_3$ nanowires have lengths of several microns.

Figure 2B:
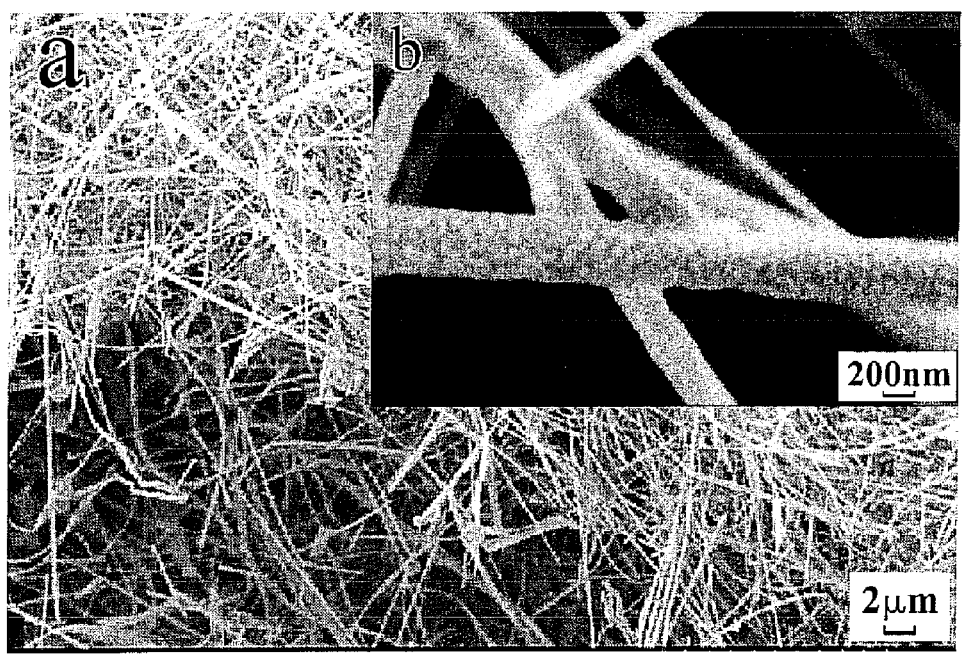
FIG. 2B is an SEM image of alumina nanowires after doping with cerium. Portion "a" of the photograph is at relatively low magnification. Portion "b" of the SEM photograph is at a higher magnification.
Figure 3B:
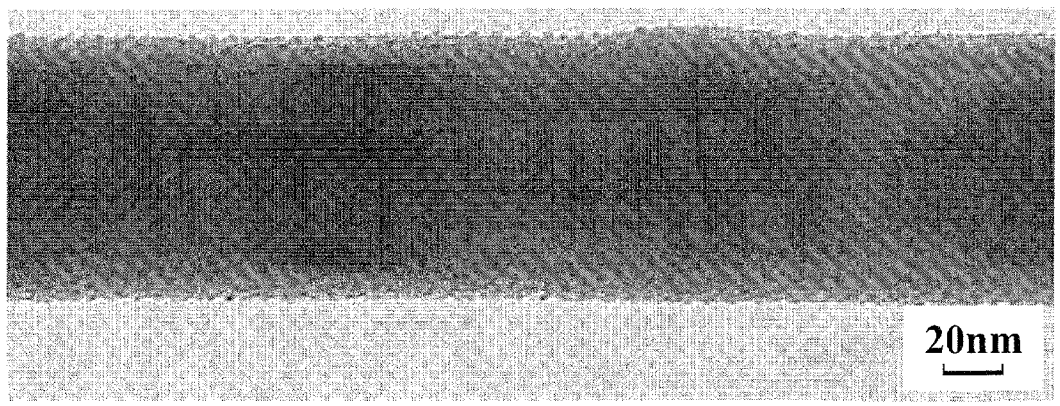
FIG. 3B is a TEM image of a free-standing alumina nanowire with cerium doping.

FIG. 2(B) shows two SEM micrographs of alpha-alumina nanowires coated with cerium oxide particles. Micrograph "a" is a relatively low magnification (2 micron scale) and the insert micrograph "b" (with the 200 nm scale) is a relatively high magnification. The higher magnification insert photograph of FIG. 2(B) shows many cerium oxide particles coating the alumina nanowires. FIG. 3B is a TEM of a freestanding cerium oxide particle coated, alumina nanowire. The freestanding nanowire is seen to have a diameter of about eighty nanometers. FIG. 2B shows that the cerium oxide particle coated $\alpha\text{-}Al_2O_3$ nanowires have lengths of several microns.

Energy Dispersive X-Ray Spectroscopy data and the ratio of the elements in the nanowires confirmed the presence of alumina and cerium oxide.

Practices of the invention make use of the formation of aluminum vapor and the vapor of at least one rare earth element (or RE-containing compound). In addition, an inert gas stream is used with a relatively low amount of oxygen to react in a controlled manner with the vapor from the aluminum particles and from the rare earth compound. A suitable temperature for producing suitable quantities of such vapors may be determined for each combination of aluminum and rare earth compound. A reactor environment temperature of about 1300° C. will often produce a suitable amount of aluminum sub-oxide vapor.

In the above example, the argon stream contained a suitable amount of oxygen for oxidation of the aluminum vapor to aluminum oxide and deposition of the oxide as alpha-aluminum nanowires. There was also sufficient oxygen for oxidation of the cerium-containing vapor and deposition of cerium oxide particles on the alumina nanowires. In the event an inert gas stream does not contain sufficient oxygen for the formation of rare earth element bearing alumina nanowires, more oxygen may be added to the gas stream. In the above examples, the flow rate of the argon stream (500 sccm) was controlled to manage the oxidation of the vaporized aluminum and rare earth element. Such a flow rate may be adjusted for the production of other rare earth element doped alumina and for other reactor sizes and configurations. The alumina nanowires may be deposited on a suitable substrate, on residual powder precursors, on surfaces of the vessel containing the powder, or on a substrate in the reactor downstream of the vessel. The use of an alumina substrate may facilitate removal of the nanowires from a reactor.

The rare earth compound is selected to provide a suitable amount of rare earth element vapor for deposition of a desired amount of rare earth element (typically as an oxide) on the forming alumina nanowires. In the above example, the cerium iodide apparently oxidized and the iodine material was carried away in the argon stream. The cerium was oxidized (to $CeO_x$, but not necessarily to a stoichiometric oxide, like $CeO_2$) and deposited as very small particles on the alumina nanowires. Again, the inert gas flow rate is managed to accommodate the co-deposition of alumina and rare earth oxide with each other.

Cerium and lanthanum iodides have been found suitable for use with aluminum powder in this thermal evaporation and co-deposition process. Cerium chloride has also been used. Of course, other rare earth halides may and other rare earth compounds may have suitable vaporization and chemical properties for the practice of these thermal vaporization and co-deposition processes.

When the rare earth element-bearing alumina nanowires are used as catalyst support materials it may be desired to more carefully control the proportions of rare earth element (s) and alumina. For many catalyst support applications a weight ratio of alumina to rare earth element may be in the range of about 30 to 450 parts of aluminum per part of rare earth element. Since this doping process uses vaporization of aluminum and one or more rare earth element compounds, some experimental adjustment of the amounts of aluminum and rare earth element precursor may be required to obtain the desired proportions of rare earth material in or on the alumina nanowires.

It may be desirable to oxidize the surfaces of RE doped-alumina nanowires before a catalyst material is deposited on them. For example, the nanowires may be oxidized by suspending them in 5.0 M nitric acid for ten hours at, for example, at temperature of about 20° to 30° C. The oxidized nanowires may then be washed thoroughly with deionized water to remove the acid and then dried under vacuum and heat.

As, stated the RE-doped alpha-alumina nanowires may be used as support surfaces of many different catalyst materials. Such materials may be deposited by any suitable physical or chemical deposition process. For example, it is contemplated that platinum and platinum group metals be deposited on the doped-alumina nanowires for catalyst applications such as the three-way treatment of HC, CO, and NOx constituents in hydrocarbon fueled engine exhausts. Examples, of such three-way exhaust catalysts include platinum, palladium, and rhodium. Of course, in other catalyst applications other metals or other catalytic materials may be deposited on the RE-doped alumina nanowires.

Electrochemistry is a powerful technique for the deposition of many metals, being both rapid and facile to easily control the nucleation and growth of metal nanoparticles on RE-doped alumina nanowires. In the example of platinum depositions, electrochemical measurements and metal deposits may be performed and accomplished using a potentiostat/galvanostat in a three-electrode, two-compartment configuration including a working electrode, a coiled platinum auxiliary electrode, and an Ag/AgCl (3M KCl) reference electrode. Electrochemical deposition of Pt nanoparticles on surfaces of RE-doped $Al_2O_3$ nanowires may be performed as a three-step process.

In a first step, the RE-doped $Al_2O_3$ nanowires may be oxidized in 5.0 M nitric acid aqueous solution at twenty degrees Celsius for 10 hours as described above. Then, to increase the electrochemical activity of the surface of the nanowires in water solution, the $Al_2O_3$ nanowire electrode (arranged as an anode in an electrolytic cell) may be cycled in the potential range of −0.15 V to +1.3 V vs. Ag/AgCl with a sweep rate of 50 $mVs^{-1}$ in 0.1 M $H_2SO_4$ aqueous electrolyte solution by cyclic voltammetry until steady curves are obtained. This surface activation step produces oxide functional groups such as hydroxyl (—OH), carboxyl (—COOH) and carbonyl (—C=O) at the defect sites located at the ends and/or the sidewalls of the nanowires.

In a second step, octahedral complexes of Pt (IV) may be formed on the functionalized RE-doped alumina nanowires. The nanowires may be arranged as the cathode in an electrolytic cell and platinum complexes from 3 mM $K_2PtCl_4$ in 0.1 M $K_2SO_4$ aqueous solutions deposited on the nanowires by cyclic voltammetry under conditions of a potential range from +0.34 to +1.34 V at a scan rate of 5 $mVs^{-1}$.

In a third step, the surface complexes on the nanowires may be converted to Pt nanoparticles through cycling from +1.64 to −0.21 V in 0.1 M $H_2SO_4$ solution.

In a chemical deposition process, platinum nanoparticles may be deposited on the alumina nanowires using a well-known impregnation method followed by reduction with borohydride. RE-doped alumina nanowires may be immersed in an aqueous solution of 10 mM $H_2PtCl_6$. After magnetic stirring for about 12 hours, the platinum salt may be reduced by slowly adding a solution that was a mixture of 0.1 M $NaBH_4$ and 1 M NaOH. When the reaction was complete, the resultant suspension of platinum nanoparticles supported on RE-doped alumina nanowires catalysts may be filtered, washed and vacuum-dried at 90° C. for 4 hours.

Practices of the invention have been illustrated with certain examples. But these examples are not intended to limit practices of the co-deposition methods.

The invention claimed is:

1. Alpha-alumina nanowires containing one or more rare earth elements, or one or more oxides of one or more rare earth elements, on or within the nanowires, the alpha-alumina nanowires further comprising nanoparticles of one or more catalytic materials supported on the nanowires.

2. Alpha-alumina nanowires as recited in claim 1 containing one or more oxides of one or more rare earth elements on or within the nanowires.

3. Alpha-alumina nanowires as recited in claim 1 containing at least one of cerium and lanthanum.

4. Alpha-alumina nanowires as recited in claim 1 containing an oxide of at least one of cerium and lanthanum.

5. Alpha-alumina nanowires as recited in claim 1 in which the proportion, by weight, of aluminum to rare earth element is in the range of about 30:1 to about 450:1.

6. A method of making rare earth element containing alumina wires having diameters in the range of about ten to about 300 nanometers, the method comprising:
heating a mixture of aluminum powder and particles of at least one compound of at least one rare earth element in a stream of oxygen-containing inert gas to produce aluminum vapor and vapor containing the rare earth element such that oxygen reacts with the vapor to form alumina nanowires containing the rare earth element or an oxide of the rare earth element.

7. A method of making rare earth element containing alumina wires as recited in claim 6 in which a stream of the oxygen-containing inert gas is flowed over the mixture and rare earth-containing alumina wires are deposited on a substrate at the location of the mixture or downstream from it.

8. A method of making rare earth element containing alumina wires as recited in claim 6 in which the rare earth element is at least one of cerium and lanthanum.

9. A method of making rare earth element containing alumina wires as recited in claim 6 in which the mixture comprises aluminum and a rare earth halide.

10. A method of making rare earth element containing alumina wires as recited in claim 6 in which the mixture comprises aluminum and a rare earth iodide.

11. A method of making rare earth element containing alumina wires as recited in claim 6 in which the aluminum and rare earth containing mixture is heated to about 1300° C.

12. A method of making rare earth element containing alumina wires as recited in claim 6 in which oxygen in oxygen-containing argon is reacted with the aluminum vapor and the vapor from the rare earth compound.

13. Alpha-alumina nanowires as recited in claim 1 containing one or more oxides of one or more rare earth elements on or within the nanowires and further comprising nanoparticles of one or more catalytic materials supported on the nanowires.

14. Alpha-alumina nanowires as recited in claim 13 in which the catalytic material is a platinum group metal.

15. A method of making rare earth element containing alumina wires as recited in claim 6 in which nanoparticles of one or more catalytic materials are deposited on the formed alumina nanowires.

\* \* \* \* \*